United States Patent
Thayer et al.

(10) Patent No.: US 9,906,503 B1
(45) Date of Patent: Feb. 27, 2018

(54) NOTIFYING A REGISTRANT IF COMMUNICATIONS BETWEEN A USER AND A THIRD PARTY HOSTING SERVICE ARE NOT SECURE

(71) Applicant: Go Daddy Operating Company, LLC, Scottsdale, AZ (US)

(72) Inventors: Wayne Thayer, Phoenix, AZ (US); Elissa Murphy, Atherton, CA (US); Marek Olszewski, San Francisco, CA (US); Silas Boyd-Wickizer, Oakland, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 15/396,003

(22) Filed: Dec. 30, 2016

(51) Int. Cl.
   *H04L 29/06* (2006.01)
   *H04L 29/08* (2006.01)
   *H04L 29/12* (2006.01)
   *H04L 9/32* (2006.01)

(52) U.S. Cl.
   CPC ........ *H04L 63/0428* (2013.01); *H04L 9/3263* (2013.01); *H04L 61/2007* (2013.01); *H04L 63/0281* (2013.01); *H04L 67/02* (2013.01); *H04L 67/141* (2013.01); *H04L 67/20* (2013.01); *H04L 67/28* (2013.01)

(58) Field of Classification Search
   CPC . H04L 63/04; H04L 63/0428; H04L 63/0281; H04L 63/0823; H04L 63/106; H04L 9/3263; H04L 67/02; H04L 67/20; H04L 67/28; H04L 67/141; H04L 61/2007
   See application file for complete search history.

(56) References Cited

U.S. PATENT DOCUMENTS

| | | | |
|---|---|---|---|
| 7,702,902 B2 * | 4/2010 | Thayer | G06Q 20/3674 713/156 |
| 7,707,404 B2 * | 4/2010 | Thayer | H04L 63/0823 713/156 |
| 8,285,816 B2 * | 10/2012 | Adelman | H04L 29/12594 709/218 |

* cited by examiner

*Primary Examiner* — Minh Dinh
(74) *Attorney, Agent, or Firm* — Quarles and Brady LLP

(57) ABSTRACT

A domain name registrar may provide a service for a domain name registrant to automatically and without further action by the domain name registrant (other than possibly paying for the service) enable secure socket layer (SSL) for a domain name to a third party hosting service, even when the domain name registrar does not own or control the third party hosting service. The invention allows a user (that may or may not be the domain name registrant) to use the domain name registered to the domain name registrant to communicate with a domain name registrant account (possibly a website) on the third party hosting service via a proxy server. The communication between the user and the proxy server may be encrypted such as by the SSL protocol.

20 Claims, 6 Drawing Sheets

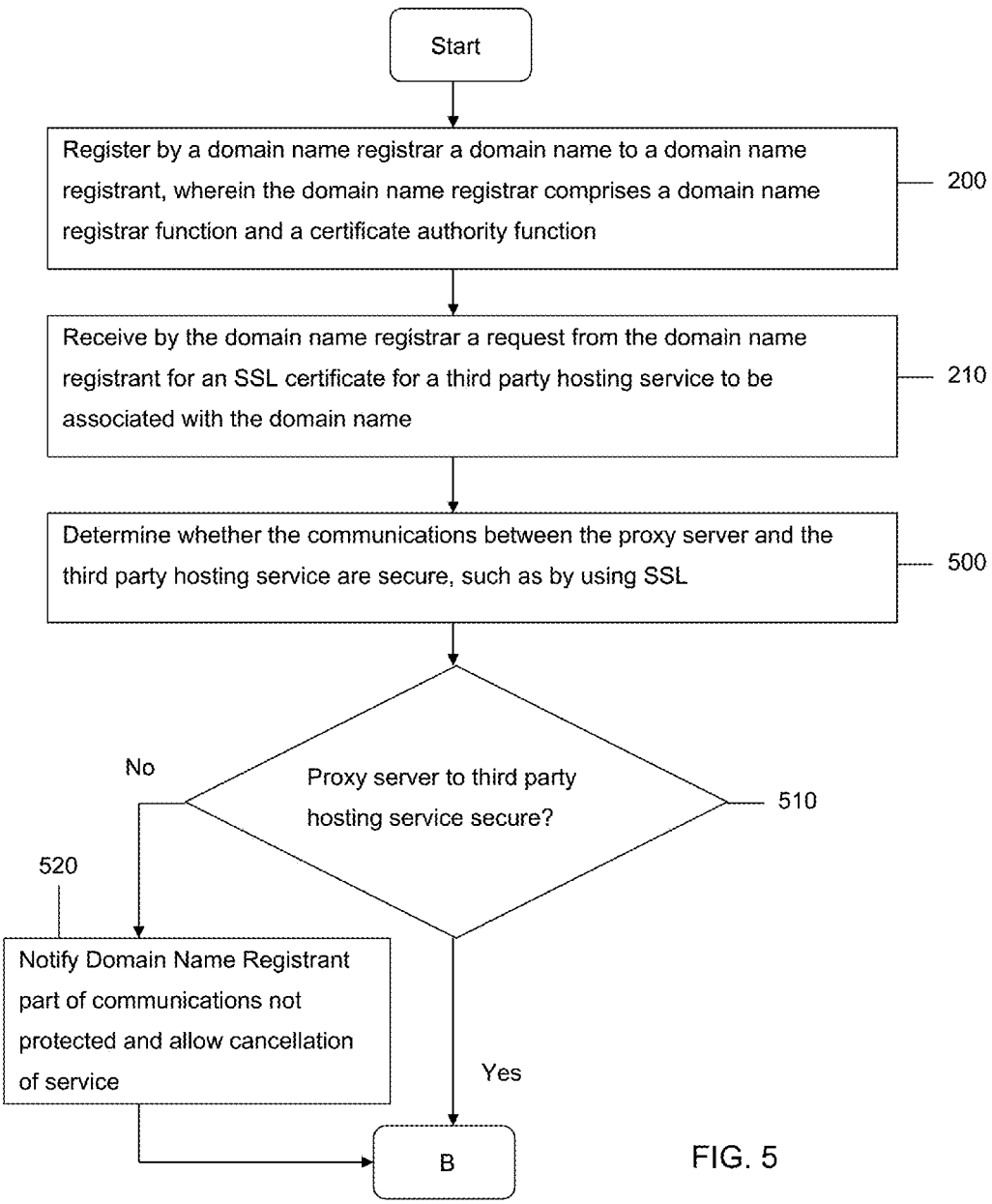

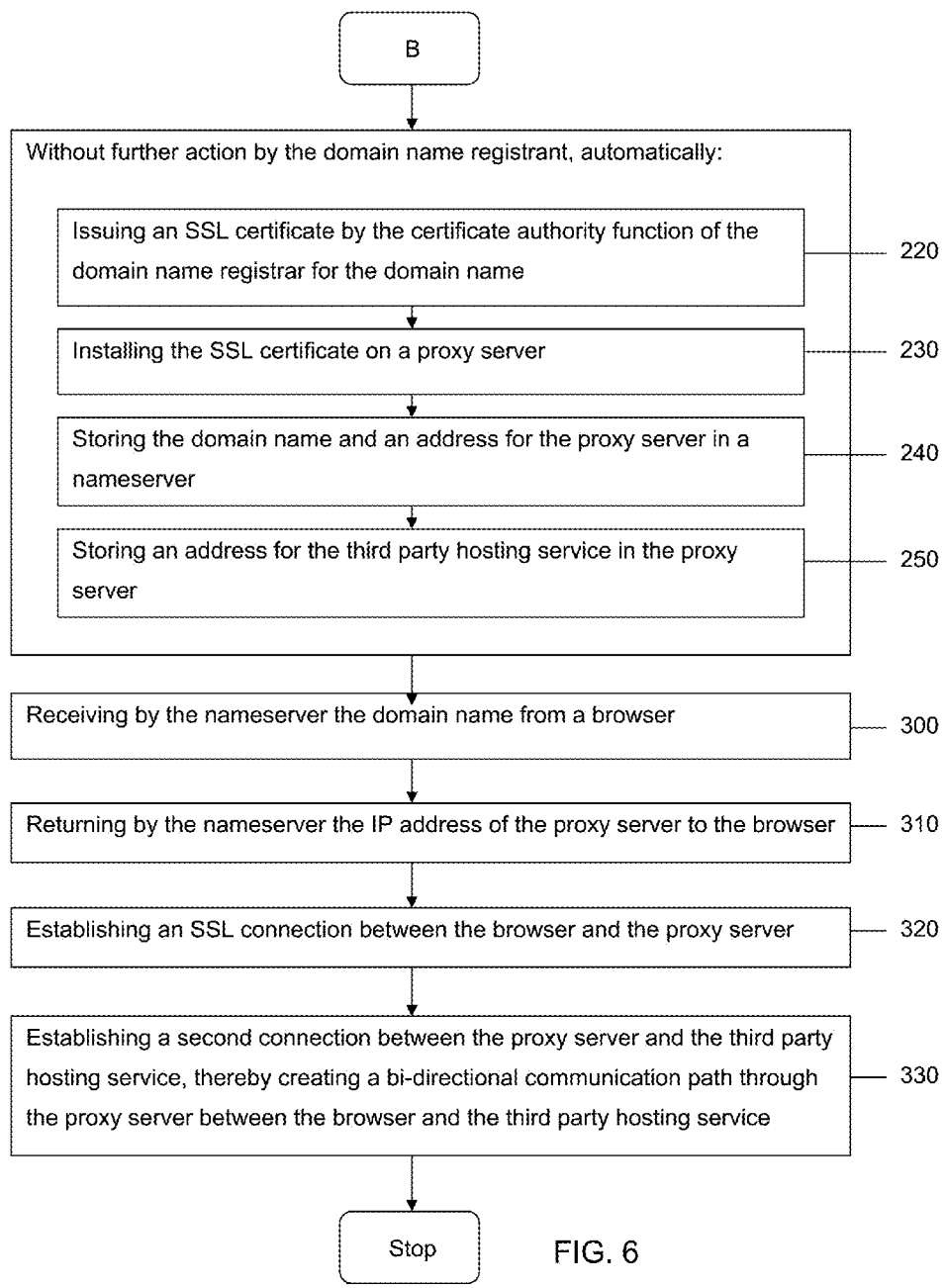

NOTIFYING A REGISTRANT IF COMMUNICATIONS BETWEEN A USER AND A THIRD PARTY HOSTING SERVICE ARE NOT SECURE

FIELD OF THE INVENTION

The present invention relates to systems and methods for automatically enabling encrypted communications between a user using a browser running on a client and a proxy server and communications between the proxy server and a third party hosting service.

SUMMARY OF THE INVENTION

A domain name registrar may provide a service to a domain name registrant to automatically enable secure socket layer, transport layer security (TLS) or any other cryptographic protocol designed to provide communications security over a computer network (hereinafter referred to as SSL) for a domain name to a third party hosting service, even when the domain name registrar does not own or control the third party hosting service. The invention allows a user (that may or may not be the domain name registrant) to use the domain name registered to the domain name registrant to access or communicate with a domain name registrant account on the third party hosting service via a proxy server. The advantage is that the communication between the user and the proxy server may be encrypted such as by the SSL protocol. The communication between the proxy server and the third party hosting service may or may not be encrypted such as by the SSL protocol as desired.

The domain name registrar preferably comprises a domain name registration function, a plurality of customer accounts, a certificate authority (CA) function, one or more nameservers and one or more proxy servers. This configuration has the advantage of allowing a domain name registrant (with a domain name managed by the domain name registrar) from an account of the domain name registrant to select and pay for an SSL connection to a third party hosting service. After making this service selection, the system may automatically and without further action by the domain name registrant prepare a certificate signing request (CSR), issue an SSL certificate based on the CSR, install the SSL certificate on the proxy server, update a nameserver so that the domain name points to the proxy server and store an address of the third party hosting service with the proxy server.

In one embodiment of the invention a domain name registrar registers a domain name to a domain name registrant. The domain name registrar may have direct control and/or ownership over a domain name registrar function, a certificate authority function, one or more nameservers that are part of the domain name system (DNS), one or more proxy servers and/or a plurality of customer accounts. The invention may function even when the domain name registrar has no direct control and/or ownership of a third party hosting service. The domain name registrar may receive a request, which request may include receiving a payment for the service, from the domain name registrant for a secure SSL certificate for the third party hosting service to be associated with the domain name.

Without further action by the domain name registrant, the domain name registrar may automatically perform the following steps. The certificate authority function of the domain name registrar may issue an SSL certificate for the domain name. The domain name registrar may install the SSL certificate on a proxy server. The domain name registrar may store the domain name and an address for the proxy server in a nameserver. The domain name registrar may store an address for the third party hosting service in the proxy server.

The performance of the previous steps configures the system so that a user may communicate with the third party hosting service via the proxy server using the domain name of the domain name registrant. The communication between the user and the proxy server may be protected by the SSL protocol while the communication between the proxy server and the third party hosting service may or may not be protected by the SSL protocol.

The process may proceed when the nameserver receives the domain name, registered to the domain name registrant, from a browser of the user. The nameserver may return the address (preferably an IP address) of the proxy server, associated with the domain name, to the browser. The proxy server may use the SSL protocol to establish a connection over the Internet between the browser of the user and the proxy server. The proxy server, using a stored address of the third party hosting service, may also establish a second connection between the proxy server and the third party hosting service. The stored address of the third party hosting service may be an IP address, a domain name or a URL. The SSL connection between the user and the proxy server and the second connection between the proxy server and the third party hosting service together permit the browser of the user to communicate with the third party hosting service via the proxy server. The second connection may or may not be an SSL connection.

In some embodiments, the domain name registrar may validate control over the domain name by the domain name registrant based on the domain name registrar receiving the request from the domain name registrant for the SSL certificate from a domain name registrant account where the domain name is also controlled or managed.

The above features and advantages of the present invention will be better understood from the following detailed description taken in conjunction with the accompanying drawings.

BRIEF DESCRIPTION OF DRAWINGS

FIGS. 5 and 6 are flowcharts that illustrate a method that may be used to automatically enable encrypted communications between an Internet user and a proxy server and encrypted or unencrypted communications between the proxy server and a third party hosting service along with the notice provided in FIG. 4.

DETAILED DESCRIPTION

Figure 1:
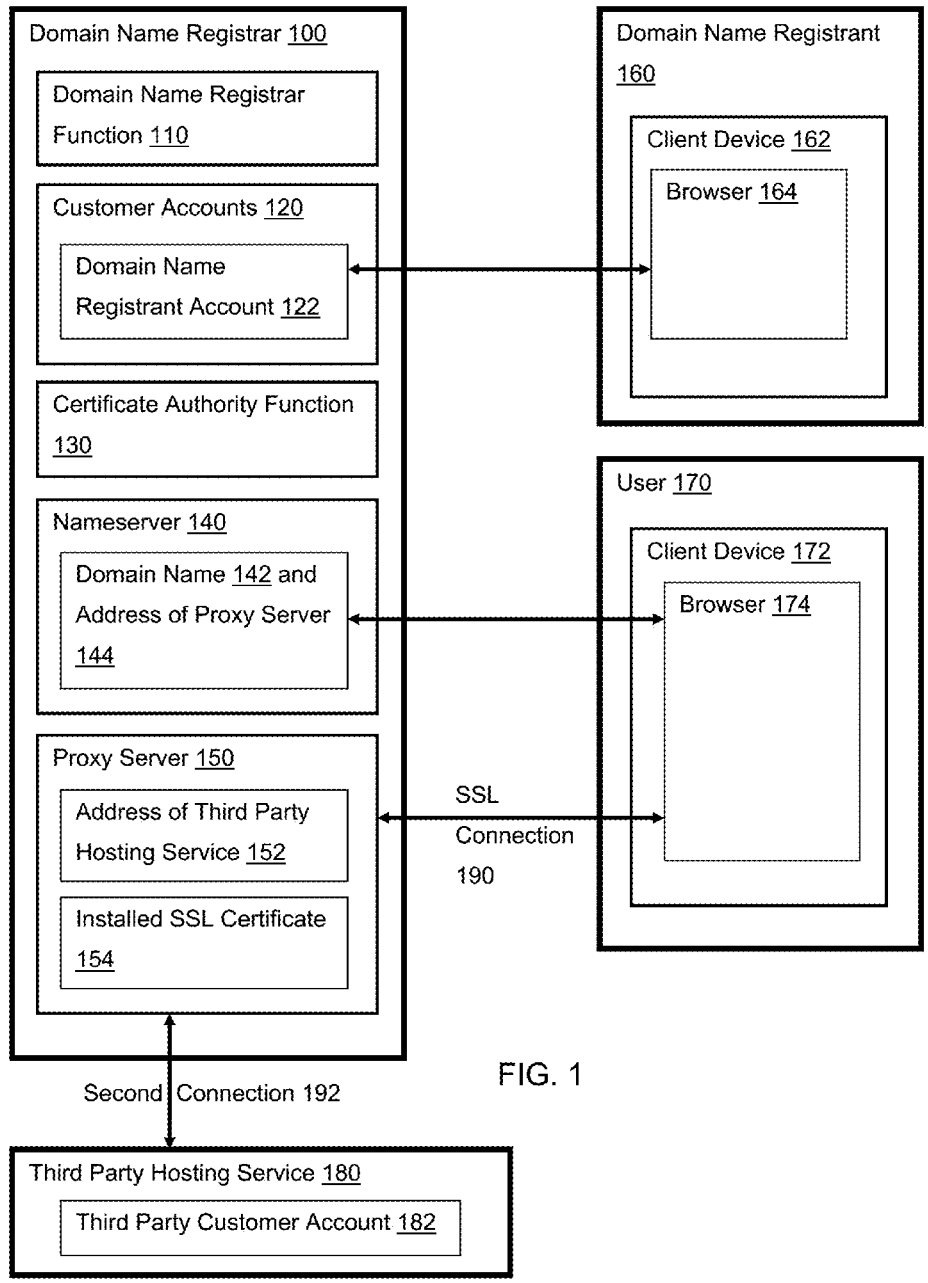
FIG. 1 is a block diagram that illustrates a system that may be used to automatically enable encrypted communications between an Internet user and a proxy server and encrypted or unencrypted communications between the proxy server and a third party hosting service.

The present invention will now be discussed in detail with regard to the attached drawing figures that were briefly described above. In the following description, numerous specific details are set forth enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Many people who use the Internet like to make information they have created available to other Internet users. The information may be posted by the information provider on, as non-limiting examples, a website or a social media account hosted by a third party hosting service. The third party hosting service may be a website hosting service hosting a website or a social media platform hosting a social media account.

The information provider may be a domain name registrant and want the information to be available on the website or the social media account using a vanity domain name (defined to be a domain name registered to the domain name registrant/information provider). In addition, the domain name registrant and Internet users may also desire to exchange the posted information over the Internet using an encrypted security protocol, such as SSL. SSL is hereby defined to include the protocols of secure sockets layer, transport layer security and any other cryptographic protocol designed to provide communications security over a computer network.

However, a third party hosting services might not allow its social media accounts to use vanity domain names and/or be SSL enabled. Even if the third party hosting service allowed vanity domain names and SSL encryption, the third party hosting service might charge a premium price for enabling SSL for the website or the social media account.

In addition, the process for setting up SSL for a website or a social media account for the vanity domain name may be challenging for the domain name registrant as the domain name registrant would have to perform several steps. Specifically, the domain name registrant would need to complete a certificate signing request (CSR) on the server that the SSL certificate will be used on and then submit the CSR to a certificate authority. The domain name registrant would also need to install an SSL certificate received from the certificate authority on the same server. The process of completing the CSR and installing the SSL certificate to enable SSL for a website or social media account may be difficult (assuming the third party hosting service even allows the functionality) for many domain name registrants.

FIG. 1 is a block diagram of a system that may be used to enable a user 170 to communicate with a third party customer account (which could be a website account or a social media account) hosted on a third party hosting service 180 via a proxy server 150 using the SSL protocol between the user 170 and the proxy server 150.

While FIG. 1 only illustrates a single domain name registrant 160, a single user 170 and a single third party hosting service 180 to make it easier to describe and understand the invention, it should be understood that the invention may be practiced as part of a larger computer network, where any number of domain name registrants, users and third party hosting services may all be used and interconnected. In addition, while only one nameserver 140 and one proxy server 150 are illustrated, the invention may be practiced with a plurality of nameservers and a plurality of proxy servers.

The arrows between parts of the domain name registrar 100, domain name registrant 160, user 170 and third party hosting service 180 represent one or more computer networks such as the Internet. Communications within the domain name registrar 100 between the domain name registrar function 110, customer accounts 120, certificate authority function 130, nameserver 140 and proxy server 150 may be over the Internet or over only local computer networks. Communications and transmissions over the Internet, computer networks and local computer networks may use any currently known or developed in the future methods or protocols, unless specifically stated otherwise.

The nameserver 140 and proxy server 150 are hereby defined to be physical machines. While the nameserver 140 and proxy server 150 comprise the hardware necessary to run software, the nameserver 140 and proxy server 150 are hereby defined to be not merely or only software. The nameserver 140 and proxy server 150 may be virtualized and/or run in one or more containers, but nevertheless must comprise at their base one or more physical servers. The nameserver 140 and the proxy server 150 may be, as non-limiting examples, one or more Dell PowerEdge(s) rack server(s), HP Blade Servers, IBM Rack or Tower servers, although other types of hardware servers and/or combinations of other hardware servers may also be used.

The Internet is a global network of interconnected computers that allows individuals and organizations around the world to communicate and to share information with one another. The Internet comprises a collection of information resources contained in documents, typically as part of a website, located on individual computers around the world and is one of the fastest growing parts of the Internet. Prevalent on the Internet are multimedia websites offering and selling goods and services and/or allowing the exchange of information to and from users of the Internet. Websites may consist of a single webpage, but typically consist of multiple interconnected and related webpages.

Each computer, host or website on the Internet is assigned at least one Internet Protocol (IP) address that uniquely identifies it from all other computers or hosts on the Internet. IP addresses are difficult to remember so a domain name service (DNS) associates websites' IP addresses with their corresponding domain names. The DNS comprises a plurality of nameservers, where each nameserver stores a plurality of domain names where each domain name corresponds with an IP address.

This permits a user 170 of the Internet to enter an easily remembered domain name into a browser 164, 174, and the browser 164, 174, via a nameserver 140 in the DNS, locates the unique IP address associated with the domain name and thus the location of the website. Another advantage of the DNS is that the website may move its physical location on the Internet, i.e. receive a new IP address, but by making the appropriate changes to the nameserver 140 in the DNS, the website may still be located using the same domain name simply by associating the domain name with an IP address of the new website.

Hundreds of millions of Internet users around the world have access to client devices 162, 172 connected to the Internet. A user 170, who could be a domain name registrant 160, may use a client device 172, such as, as non-limiting examples, a cell phone, PDA, tablet, laptop computer or desktop computer to access a website via the Internet.

The user 170 is able to access data at specific locations on the Internet referred to as websites. Each website may consist of a single webpage, but typically consist of multiple interconnected and related webpages. Websites may be, as a non-limiting example, created using HyperText Markup Language (HTML) to generate a standard set of tags that define how the webpages for the website are to be displayed. A third party customer account may be a website or portal used to exchange information over the Internet and may be hosted by a third party hosting service 180, i.e., a hosting provider.

Hosting providers may provide the hardware, such as hosting servers, and the infrastructure necessary to host one or more websites, possibly for a plurality of domain name registrants who are website operators/owners. Menus, links, tabs, etc. may be used to move between different web pages within a website or to move to a different webpage on a different website.

Users may access websites using software known as an Internet browser 164, 174, such as MICROSOFT INTERNET EXPLORER, GOOGLE CHROME or MOZILLA FIREFOX. After the browser 164, 174 has located a desired webpage in a desired website, the browser 164, 174 requests and receives information regarding the webpage, typically in the form of an HTML document, and then displays the webpage for the user 170 on the user's client device 172. The user 170 may then view other webpages at the same website or move to an entirely different website using the browser 164, 174.

Browsers are able to locate specific websites because each website has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6), is a 128-bit binary number. The standard human readable notation for IPv6 addresses presents the address as eight 16-bit hexadecimal words, each separated by a colon (e.g., 2EDC:BA98:0332: 0000:CF8A: 000C:2154:7313).

However, IP addresses, even in human readable notation, are difficult for users to remember and use. A domain name is easier to remember and may be associated with an IP address of a website on the Internet. A browser 164, 174 may be able to access the website on the Internet through the use of the domain name.

Domain names are also much easier to remember and use than their corresponding IP addresses. The Internet Corporation for Assigned Names and Numbers (ICANN) and the Internet Assigned Numbers Authority (IANA) create rules and coordinate the use of over 1,000 Top-Level Domains (TLDs). Each TLD is typically assigned a single registry to be an authoritative source of information (the particular data stored by the registry varies depending on the TLD). One or more domain name registrars 100 may register domain names to domain name registrants on behalf of a registry.

The process for registering a domain name with .com, .net, .org, and some other TLD allows a domain name registrant 160 to use an ICANN-accredited domain name registrar 100 to register a domain name 142. For example, if a domain name registrant 160, John Doe, wishes to register the domain name 142 "johndoe.com," the domain name registrant 160 may initially determine whether the desired domain name 142 is available by contacting a domain name registrar 100. The domain name registrant 160 may make this contact using a website of the domain name registrar 100 and typing the desired domain name 142 into a field on a webpage of the website of the registrar 100 created for this purpose.

Upon receiving a domain name 142 or a domain name search request from the user 170, the registrar 100 may ascertain whether "johndoe.com" has already been registered by, as non-limiting examples, checking the shared resource system (SRS) associated with the TLD of the domain name 142 or by checking with the authoritative registry of the TLD for the domain name 142. The results of the search may be displayed on a webpage of the registrar 100 to notify the domain name registrant 160 of the availability of the desired domain name 142.

If the desired domain name 142 is available, the domain name registrant 160 may register the domain name 142, thereby becoming the official domain name registrant 160 of the domain name 142. If the desired domain name is not available for registration, the domain name registrar 100 may transmit one or more suggested domain names to the domain name registrant 160 to permit the domain name registrant 160 to select and register one or more of the suggested domain names.

A domain name registrant 160 may register one or more domain names 142 using this process. (Step 200) The domain name registrar 100 may manage a plurality of customer accounts 120 used by a plurality of domain name registrants. Each domain name registrant 160 may register and thereafter control or manage one or more domain names 142 from their domain name registrant account 122. In preferred embodiments, the domain name registrant accounts 122 in the customer accounts 120 are password protected to ensure only the domain name registrant 160 that created the domain name registrant account 122 with the domain name registrar 100 may access their domain name registrant account 122.

The DNS may comprise hardware servers and files that are cooperatively operated by entities (such as registries and domain name registrars 100). The DNS is a hierarchical distributed naming system for websites (and other resources) connected to the Internet. The DNS is also an Internet service that translates a domain name 142 into an IP address that may, for example, point to, i.e., be the address for, a website. As an example, a browser 164, 174 may transmit the domain name 142 johndoe.com to a nameserver 140 of the DNS and the nameserver 140 may translate the domain name 142 johndoe.com into the IP address of 111.222.121.123. The browser 164, 174 may then use this IP address to find the website associated with the domain name 142 johndoe.com.

Each nameserver 140 may also comprise one or more hardware servers that are connected to the Internet. Nameservers are able to translate domain names into their corresponding IP addresses in response to queries from browsers or other services. Domain name registrars 100, hosting providers and DNS providers may enable their customers (domain name registrants, users and/or website operators) to store their domain names and associated IP addresses in one or more nameservers. In this manner, a domain name 142 (such as johndoe.com) registered to a domain name registrant 160 may be translated by a nameserver 140 (that is part of the DNS) into an IP address. The IP address may point to a resource, such as a website owned and operated by the domain name registrant 160 of the domain name 142. A browser 164, 174 may receive from the nameserver 140 the IP address associated with the domain name 142 and then the browser 164, 174 may use the IP address to locate a website associated with the IP address.

A common method for websites to protect their users from fraud is to obtain a Secure Sockets Layer (SSL) Certificate for their domain name 142 and the website pointed to by the domain name 142. An SSL certificate for a domain name 142 lets users of the website pointed to by the domain name 142 know that the owner of the website has been verified by a trusted third party (Certificate Authority or CA) and that confidential communications with the website are encrypted. SSL includes a protocol for transmitting private documents via the Internet. SSL protects confidential information by using a private key to encrypt data transferred over an SSL connection 190.

Common conventional browsers 164, 174, such as NETSCAPE NAVIGATOR and INTERNET EXPLORER, support the SSL protocol, and many websites use the protocol to obtain confidential user information from their users. By convention, Uniform Resource Locators (URLs) that use an SSL connection 190 start with "https:" instead of "http:".

A domain name registrar 100 may provide a service to a domain name registrant 160 to automatically enable secure socket layer (SSL) for a domain name 142 to a third party hosting service 180, even when the domain name registrar 100 does not own or control the third party hosting service 180. The invention allows a user 170 (that may or may not be the domain name registrant 160) to use the domain name 142 registered to the domain name registrant 160 to access or communicate with a third party customer account 182 on the third party hosting service 180 via a proxy server 150. The advantage is that the communication between the user and the proxy server 150 may be encrypted such as by the SSL protocol. The communication between the proxy server 150 and the third party hosting service 180 may or may not be encrypted such as by the SSL protocol as desired.

Another advantage of this system is that it allows for vanity domain names to be used with SSL even for third party hosting services 180 that do not allow for vanity domain names and/or SSL services. In addition, this system also does not require the domain name registrant 160 to complete a CSR or install an SSL certificate on the server being used by the third party hosting service 180 or on a proxy server 150. This greatly simplifies the process of obtaining an SSL enabled domain name to a third party hosting service 180 for the domain name registrant 160.

A potential disadvantage of this system is that while the communication between the user 170 and the proxy server 150 may use SSL, the communication between the proxy server 150 and the third party hosting service 180 might not use SSL. This may or may not be a concern to the domain name registrant 160.

This might not be a concern to the domain name registrant 160 or the user 170 as the communication path between the user 170 and the proxy server 150 is the most vulnerable and thus benefits the most by being SSL protected. This communication path is the most vulnerable as the user 170 may be in a public location and/or is not communicating from a secure facility, and in fact, may be using equipment (such as routers and wifi connections) belonging to unknown third parties. In contrast, the proxy server 150 and the third party hosting service 180 are preferably located within different secure facilities using privately owned, controlled and monitored hardware thereby reducing the risk of a security breach between the proxy server 150 and the third party hosting service 180.

The domain name registrar 100 preferably comprises a domain name registration function, a plurality of customer accounts 120, a certificate authority function 130, one or more nameservers 140 and one or more proxy servers 150. This configuration has the advantage of allowing a domain name registrant 160 (with a domain name 142 managed by the domain name registrar 100) from an account of the domain name registrant 122 to select and pay for an SSL connection 190 to a third party hosting service 180.

Figure 4:
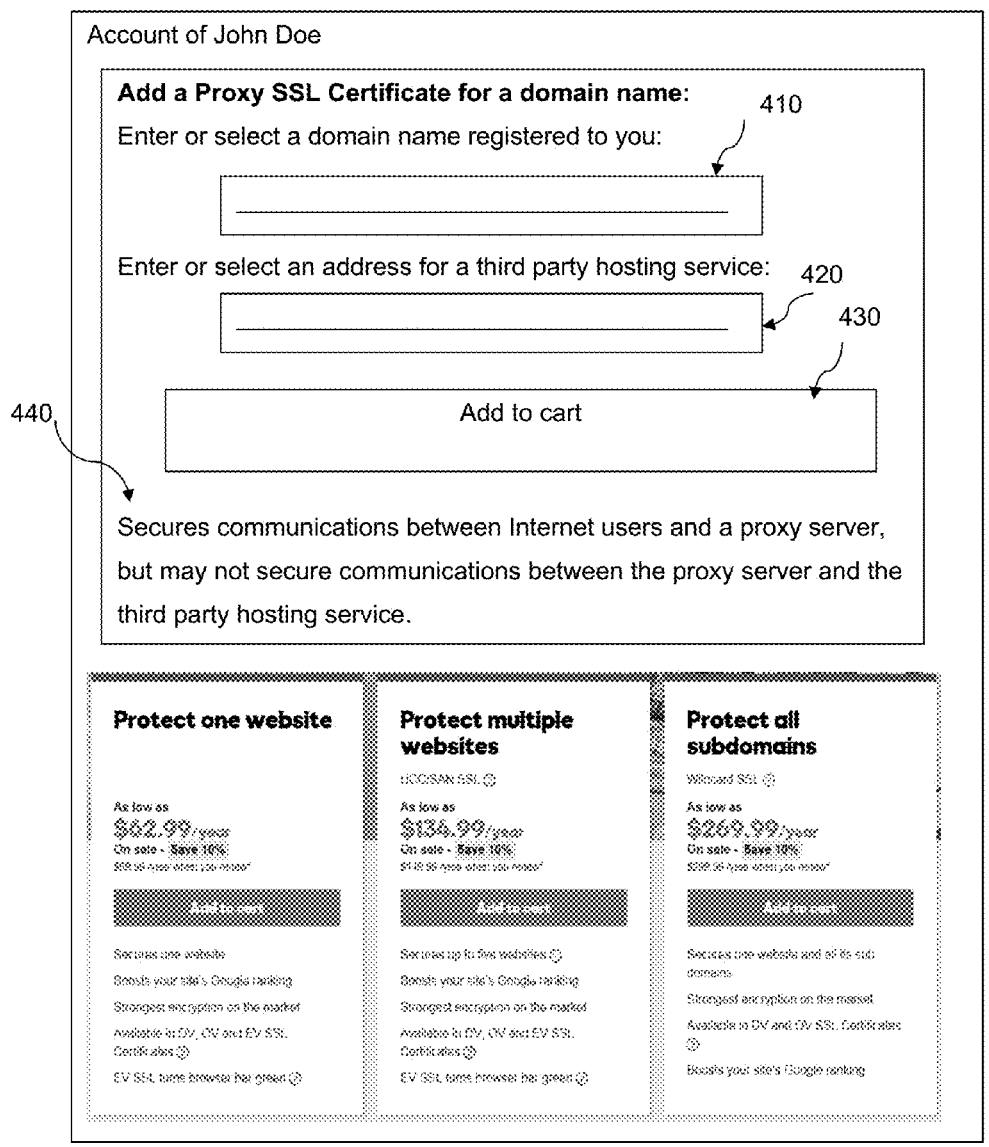
FIG. 4 is an example screenshot of a webpage on a website operated by a domain name registrar that notifies the domain name registrant that the communications between Internet users and a proxy server are secure, but that the communications between the proxy server and the third party hosting service are not secure (in some embodiments of the invention).

FIG. 4, as a non-limiting example, is a screenshot of a webpage 400 on a website operated by a domain name registrar 100. In this example webpage 400 the domain name registrant 160 may enter the domain name to be associated with an SSL certificate for a third party hosting service 180 in a field 410 created for this purpose. As another non-limiting example, the webpage 400 may list one or more domain names registered to the domain name registrant 160 and allow the domain name registrant 160 to select one or more listed domain names to be associated with an SSL certificate for a third party hosting service 180.

In the example webpage 400 illustrated in FIG. 4, the domain name registrant 160 may also enter an address and/or select a third party hosting service to be associated with an SSL certificate for the domain name in a field 420 created for this purpose. If there is already a website configured for the domain name, the DNS record will point to the website. To enable the proxy, the domain name registrant 160 may select the DNS record (@ or 'www' as non-limiting examples) that the domain name registrant 160 desires the domain name registrar 100 to proxy.

As another non-limiting example, the webpage 400 may list one or more third party hosting services 180 and allow the domain name registrant 160 to select one or more third party hosting services 180 to be associated with an SSL certificate for the selected domain name.

Referring to FIGS. 5 and 6, the domain name registrar 100 may determine whether the communications between the proxy server 150 and the third party hosting service 180 may be made secure. (Steps 500 and 510) In preferred embodiments the domain name registrant 160 is notified as to whether or not the communications between the proxy server 150 and the third party hosting service 180 are secure.

As a non-limiting example, an example webpage 400 may include text 440 that notifies the domain name registrant 160 that the communications between Internet users 170 and a proxy server 150 are secure (protected by the SSL protocol), but that the communications between the proxy server 150 and the third party hosting service 180 are not secure. (Step 520) In embodiments where the communications between the proxy server 150 and the third party hosting service 180 are secure (such as by being protected by the SSL protocol), then the text may be updated to let the domain name registrant 160 know that the communications between the proxy server 150 and the third party hosting service 180 are secure.

After the domain name registrant 160 has entered and/or selected a domain name registered to the domain name registrant 160, entered an address for or selected one or more third party hosting services 180, the domain name registrant 160 may select to add this service to a shopping cart by pressing a button/icon 430 on the webpage 400 created for this purpose. The domain name registrant 160 may pay for this service.

After making this service selection (and possibly paying), the system may automatically and without further action by the domain name registrant 160, prepare a certificate signing request (CSR), issue an SSL certificate based on the CSR for the domain name, install the SSL certificate 154 on the proxy server 150, update a nameserver 140 to store the domain name 142 and an address of the proxy server 144 and store an address of the third party hosting service 152 or third party customer account in a database that may be accessed by the proxy server 150. Specifically, after requesting the service, such as by entering or selecting the items 410, 420 and 430 listed on the example webpage 400, the domain name registrant 160 does not prepare the certificate signing request to receive the SSL certificate 150 nor does the domain name registrant 160 install the SSL certificate 150 on the proxy server 150, thereby greatly simplifying the process for the domain name registrant 160 to receive an SSL enable domain name for a third party hosting service (where the SSL certificate is actually installed on a proxy server 150).

In one embodiment of the invention a domain name registrar 100 registers a domain name 142 to a domain name registrant 160. The domain name registrar 100 may have direct control and/or ownership over a domain name registrar function 110, a certificate authority function 130, one or more nameservers 140 that are part of the domain name system (DNS), one or more proxy servers 150 and/or a plurality of customer accounts 120. The invention may function even when the domain name registrar 100 has no direct control and/or ownership of a third party hosting service 180. The domain name registrar 100 may receive a request, which request may include receiving payment for the service, from the domain name registrant 160 for a secure SSL certificate for the third party hosting service 180 to be associated with the domain name 142. The request may be received, as a non-limiting example, through a webpage 400 of a website operated by the domain name registrar 100.

Without further action by the domain name registrant 160, the domain name registrar 100 may automatically perform the following steps. The certificate authority function 130 of the domain name registrar 100 may issue an SSL certificate for the domain name 142.

The domain name registrar 100 may install the SSL certificate on a proxy server 150. The domain name registrar 100 may store the domain name 142 and an address for the proxy server 150 in a nameserver 140. The domain name registrar 100 may store an address for the third party hosting service 180 in the proxy server 150.

Figure 2:
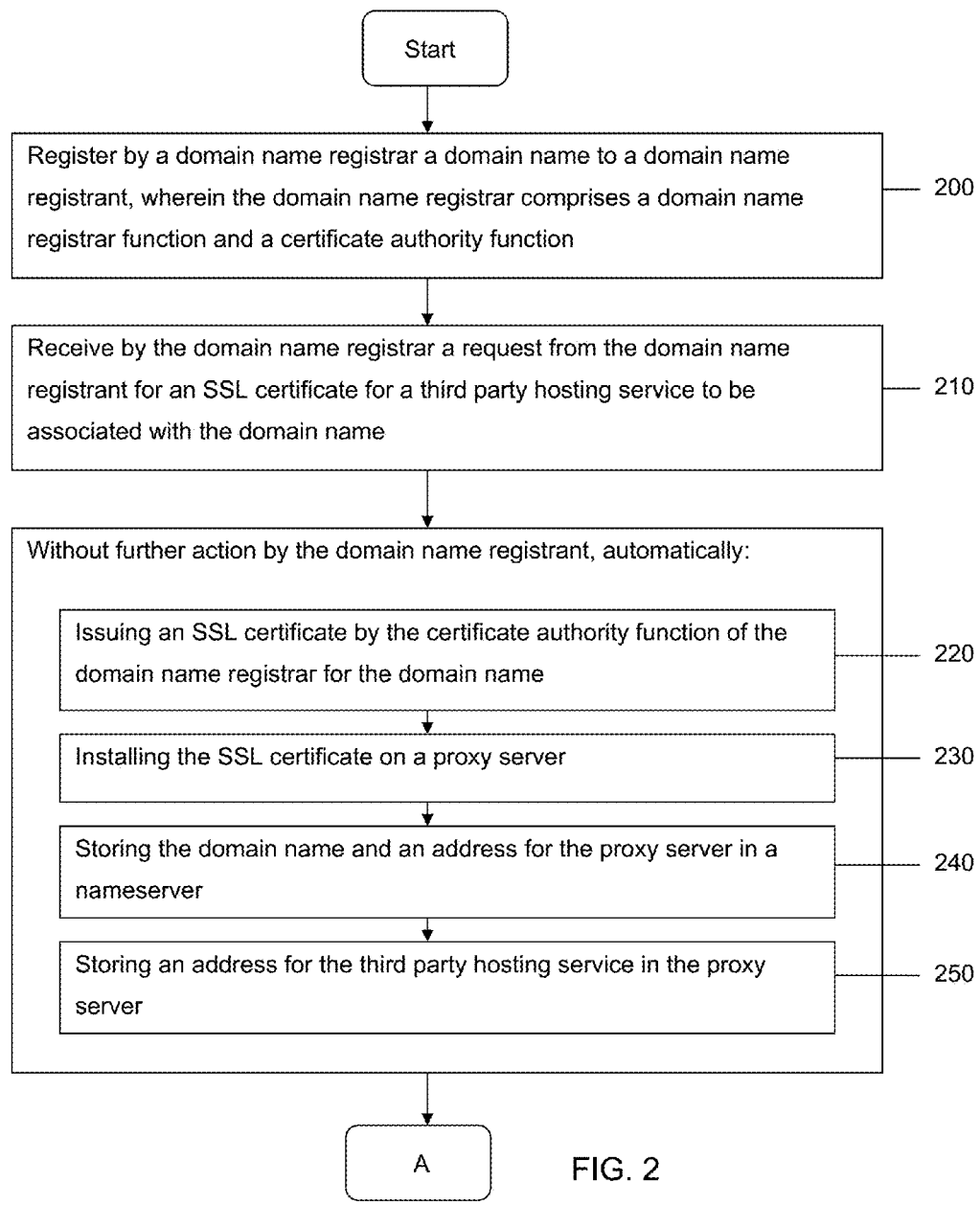
FIGS. 2 and 3 are flowcharts that illustrate a method that may be used to automatically enable encrypted communications between an Internet user and a proxy server and encrypted or unencrypted communications between the proxy server and a third party hosting service.
Figure 3:
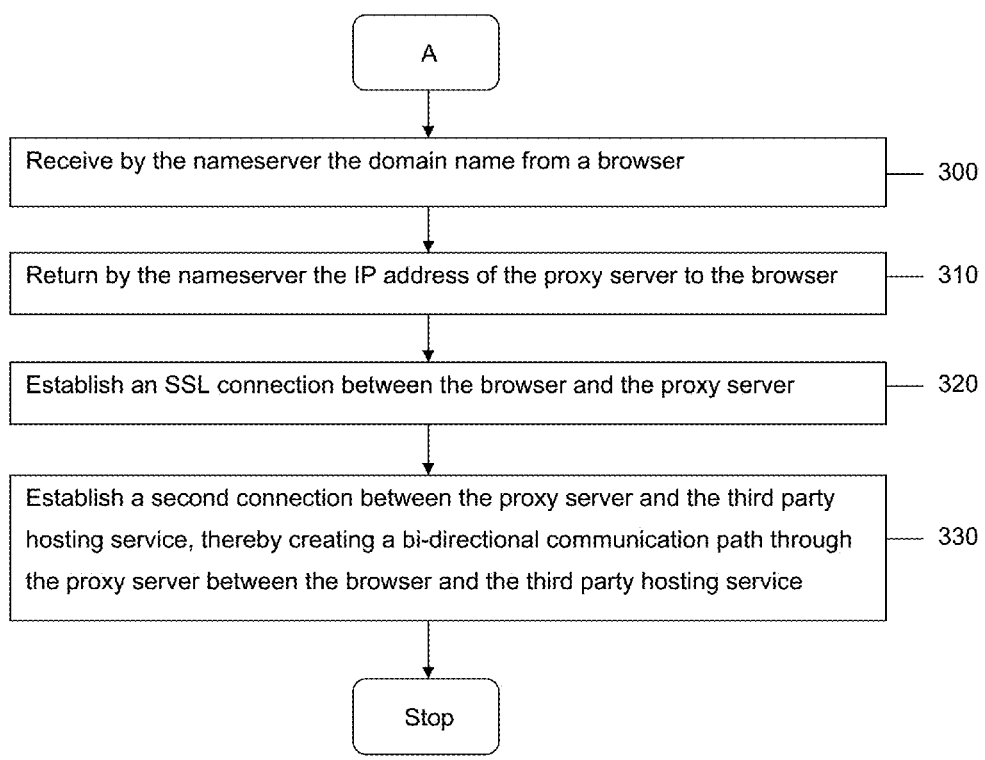

As illustrated in FIGS. 2 and 3, a domain name registrar 100 may receive a request from a domain name registrant 160, preferably from a password protected domain name registrant account of the domain name registrant 160 from which the domain name 142 was registered with the domain name registrar 100. The request may be that a domain name 142 registered to the domain name registrant 160 be enabled to access a third party customer account (such as a website owned by the domain name registrant 160) hosted by a third party hosting service 180. The request may also be for an SSL certificate to be issued for the domain name and the SSL certificate to be installed on a proxy server 150. (Step 210)

One advantage of the present invention is that the domain name registrar 100 may be a different legal entity and/or have no management control (only general access granted to customers, Internet users and/or other companies) over the third party hosting service 180.

Upon receiving this request, which request may comprise, for example, making a selection on a webpage 400 for this service, and without further action by the domain name registrant 160, a certificate authority (CA) function of the domain name registrar 100 may issue an SSL certificate for the domain name 142. (Step 220) The domain name registrar 100 may validate control over the domain name 142 by the domain name registrant 160 based on the domain name registrar 100 receiving the request for the SSL certificate from an account 122 of the domain name registrant 160 where the domain name 142 was registered and/or is managed by the domain name registrant 160.

The SSL certificate may be installed on a proxy server 150. (Step 230) The domain name registrar 100 may update a nameserver 140 by storing the domain name 142 and an associated IP address of the proxy server 150 in a nameserver 140. (Step 240) Finally, the domain name registrar 100 may store an address for the third party hosting service 180, which may comprise an address for a third party customer account (such as a website owned by the domain name registrant 160) in a database accessible by the proxy server 150. (Step 250) As a non-limiting example, the address may be a URL, such as https://www.thirdpartyservice.com or an IP address, such as 1.160.10.240.

The performance of the previous steps configures the system so that a user 170 may communicate with the third party hosting service 180 via the proxy server 150 using the domain name 142 of the domain name registrant 160. The communication between the user 170 and the proxy server 150 may be protected by the SSL protocol while the communication between the proxy server 150 and the third party hosting service 180 may or may not be protected by the SSL protocol.

The process may proceed when the nameserver 140 receives the domain name 142, registered to the domain name registrant 160, from a browser 174 of the user 170. (Step 300) The nameserver 140 may return the address (preferably an IP address) of the proxy server 150, associated with the domain name 142, to the browser 174. (Step 310)

The proxy server 150 may use the SSL protocol to establish a connection over the Internet between the browser 174 of the user 170 and the proxy server 150. (Step 320) The proxy server 150, using a stored address of the third party hosting service 180, may also establish a second connection 192 between the proxy server 150 and the third party hosting service 180. (Step 330)

The stored address of the third party hosting service 180 may be an IP address, a domain name or a URL. The SSL connection 190 between the user 170 and the proxy server 150 and the second connection 192 between the proxy server 150 and the third party hosting service 180 together permit the browser 174 of the user 170 to communicate with the third party hosting service 180 via the proxy server 150. The second connection 192 may or may not be an SSL connection.

In some embodiments, the domain name registrar 100 may validate control over the domain name 142 by the domain name registrant 160 based on the domain name registrar 100 receiving the request from the domain name registrant 160 for the SSL certificate from a domain name registrant account 122 where the domain name 142 is also controlled or managed.

An advantage of the present system and method is that the domain name registrant 160 does not have to complete a certificate signing request (CSR), the domain name registrar 100 and/or certificate authority may perform this step automatically for the domain name registrant 160.

Another advantage of the present system and method is that the domain name registrant 160 does not have to install the SSL certificate on a website, the domain name registrar 100, certificate authority function 130 and/or the proxy server may work together to automatically install the SSL certificate on the proxy server.

Another advantage of the present system and method is that the domain name registrar 100 may validate the domain name registrant 160 if the domain name registrar 100 receives a request for the disclosed service from the same domain name registrant account 122 that the domain name registrant 160 registered the domain name 142 from the same domain name registrant account that the domain name registrant 160 manages the domain name.

In view of the foregoing, it will be understood by those skilled in the art that the systems and processes of the present invention can facilitate a secure communication protocol for an Internet user 170 to communicate with a third party hosting service 180 or a third party customer account via a proxy server 150. The above-described embodiments have been provided by way of example, and the present invention is not limited to these examples. For example, while the SSL protocol was disclosed in some detail, other encryption protocols may also be used with the present invention. It should be noted that the present invention can be extended to a plurality of domain name registrants, a plurality of Internet users and a plurality of third party hosting services comprising a plurality of third party customer accounts.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention.

One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method.

Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

The invention claimed is:

1. A method, comprising the steps of:
    receiving by a domain name registrar a request from a domain name registrant for an SSL certificate for a third party hosting service to be associated with a domain name, wherein the domain name registrar comprises a domain name registrar function, a certificate authority function, a nameserver and a proxy server;
    determining by the domain name registrar whether the communications between the proxy server and the third party hosting service will be able to use a secure protocol;
    based on a determination by the domain name registrar that communications between the proxy server and the third party hosting service will not be able to use the secure protocol, notifying by the domain name registrar the domain name registrant that communications between the proxy server and the third party hosting service will not be secure;
    upon receiving the request, and without requiring further action by the domain name registrant, the domain name registrar:
        installing the SSL certificate on a proxy server, wherein the proxy server is not the third party hosting service,
        storing the domain name and an address for the proxy server in a nameserver, and
        storing an address for the third party hosting service in a database accessible by the proxy server;
    receiving by the nameserver the domain name from a browser;
    transmitting by the nameserver the address of the proxy server to the browser;
    establishing an SSL connection between the browser and the proxy server; and
    establishing a second connection between the proxy server and the third party hosting service, thereby creating a bi-directional communication path through the proxy server between the browser and the third party hosting service.

2. The method of claim 1, wherein the domain name registrar notifies the domain name registrant on a webpage of the domain name registrar that communications between the proxy server and the third party hosting service will not be secure.

3. The method of claim 1, wherein the second connection between the proxy server and the third party hosting service is not an SSL connection.

4. The method of claim 1, wherein the address for the third party hosting service is an IP address, a domain name or a URL.

5. The method of claim 1, wherein a first legal entity owns, controls and comprises the domain name registrar function, the certificate authority function, the nameserver and the proxy server and a second legal entity, different from the first legal entity, owns, controls and comprises the third party hosting service.

6. The method of claim 1, further comprising the step of:
the domain name registrar validating control over the domain name by the domain name registrant based on the domain name registrar receiving the request for the SSL certificate from a domain name registrant account where the domain name was registered or is managed from.

7. A method, comprising the steps of:
receiving by a domain name registrar a request from a domain name registrant for an SSL certificate for a third party hosting service to be associated with a domain name, wherein the domain name registrar comprises a domain name registrar function and a certificate authority function;
determining by the domain name registrar whether the communications between a proxy server and the third party hosting service will be able to use a secure protocol;
based on a determination by the domain name registrar that communications between the proxy server and the third party hosting service will not be able to use the secure protocol, notifying by the domain name registrar the domain name registrant that communications between the proxy server and the third party hosting service will not be secure; and
without further action by the domain name registrant, automatically:
issuing an SSL certificate by the certificate authority function of the domain name registrar for the domain name;
installing the SSL certificate on a proxy server;
storing the domain name and an address for the proxy server in a nameserver; and
storing an address for the third party hosting service in a database accessible to the proxy server.

8. The method of claim 7, further comprising the steps of:
receiving by the nameserver the domain name from a browser;
transmitting by the nameserver the address of the proxy server to the browser;
establishing an SSL connection between the browser and the proxy server; and
establishing a second connection between the proxy server and the third party hosting service, thereby creating a bi-directional communication path through the proxy server between the browser and the third party hosting service.

9. The method of claim 8, wherein the domain name registrar notifies the domain name registrant on a webpage of the domain name registrar that communications between the proxy server and the third party hosting service will not be secure.

10. The method of claim 8, wherein the second connection between the proxy server and the third party hosting service is not an SSL connection.

11. The method of claim 7, wherein the address for the third party hosting service is an IP address, a domain name or a URL.

12. The method of claim 7, wherein a first legal entity owns, controls and comprises the domain name registrar function, the certificate authority function and the nameserver and a second legal entity, different from the first legal entity, owns, controls and comprises the third party hosting service.

13. The method of claim 7, further comprising the step of:
the domain name registrar validating control over the domain name by the domain name registrant based on the domain name registrar receiving the request for the SSL certificate from an account of the domain name registrant where the domain name was registered or is managed from.

14. A system, comprising:
a domain name registrar function configured to:
register a domain name to a domain name registrant, wherein the domain name is managed in a domain name registrant account;
determine by the domain name registrar whether communications between a proxy server and a third party hosting service will be able to use a secure protocol; and
based on a determination by the domain name registrar that communications between the proxy server and the third party hosting service will not be able to use the secure protocol, notify by the domain name registrar the domain name registrant that communications between the proxy server and the third party hosting service will not be secure;
a certificate authority function configured to, upon receiving a request from the domain name registrant account, issue an SSL certificate for the domain name, wherein the domain name allows a browser to access a third party hosting service;
a proxy server configured to install the SSL certificate for the domain name on the proxy server, establish an SSL connection between the browser and the proxy server and establish a second connection between the proxy server and the third party hosting service; and
a nameserver configured to store the domain name and an address for the proxy server.

15. The system of claim 14, wherein the domain name registrar function, the certificate authority function, the proxy server and the nameserver are all owned, controlled and operated by the same legal entity.

16. The system of claim 14, wherein the domain name registrar function, the certificate authority function, the proxy server and the nameserver are configured to upon receiving the request for the SSL certificate for the domain name from the domain name registrant, automatically and without further action by the domain name registrant:
issue the SSL certificate for the domain name,
install the SSL certificate on the proxy server,
update the nameserver to store the domain name and the address for the proxy server; and
update the proxy server to store an address for the third party hosting service.

17. The method of claim 14, wherein the domain name registrar notifies the domain name registrant on a webpage of the domain name registrar that communications between the proxy server and the third party hosting service will not be secure.

18. The method of claim 14, wherein the second connection between the proxy server and the third party hosting service is not an SSL connection.

19. The method of claim 16, wherein the address for the third party hosting service is an IP address, a domain name or a URL.

20. The method of claim 14, wherein a first legal entity owns, controls and comprises the domain name registrar function, the certificate authority function, the nameserver and the proxy server and a second legal entity, different from the first legal entity, owns, controls and comprises the third party hosting service.

* * * * *